US009312655B2

(12) United States Patent
Akino et al.

(10) Patent No.: US 9,312,655 B2
(45) Date of Patent: Apr. 12, 2016

(54) PLANAR WAVEGUIDE LASER PUMPING MODULE AND PLANAR WAVEGUIDE WAVELENGTH CONVERSION LASER DEVICE

(71) Applicants: Yosuke Akino, Tokyo (JP); Takayuki Yanagisawa, Tokyo (JP)

(72) Inventors: Yosuke Akino, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/420,213

(22) PCT Filed: Dec. 3, 2012

(86) PCT No.: PCT/JP2012/081272
§ 371 (c)(1),
(2) Date: Feb. 6, 2015

(87) PCT Pub. No.: WO2014/087468
PCT Pub. Date: Jun. 12, 2014

(65) Prior Publication Data
US 2015/0229096 A1  Aug. 13, 2015

(51) Int. Cl.
*H01S 3/0941* (2006.01)
*H01S 3/063* (2006.01)
*H01S 3/02* (2006.01)
(Continued)

(52) U.S. Cl.
CPC ............... *H01S 3/0941* (2013.01); *H01S 3/025* (2013.01); *H01S 3/042* (2013.01); *H01S 3/0606* (2013.01); *H01S 3/0623* (2013.01); *H01S 3/0632* (2013.01); *H01S 3/094038* (2013.01); *H01S 3/109* (2013.01); *H01S 3/1643* (2013.01); *H01S 3/1653* (2013.01); *H01S 3/1673* (2013.01); *H01S 3/1685* (2013.01); *H01S 3/1698* (2013.01); *H01S 3/08077* (2013.01); *H01S 3/1608* (2013.01); *H01S 3/1618* (2013.01); *H01S 3/17* (2013.01); *H01S 3/2383* (2013.01)

(58) Field of Classification Search
CPC ..... H01S 3/0941; H01S 3/1698; H01S 3/109; H01S 3/1673; H01S 3/1643; H01S 3/0606; H01S 3/025; H01S 3/094038; H01S 3/1653; H01S 3/0623; H01S 3/042; H01S 3/1685
See application file for complete search history.

(56) References Cited

U.S. PATENT DOCUMENTS

| 6,160,824 A * | 12/2000 | Meissner et al. .................. 372/7 |
| 2003/0048524 A1* | 3/2003 | Chavez-Pirson et al. ..... 359/333 |

(Continued)

FOREIGN PATENT DOCUMENTS

| JP | 2002-528900 A | 9/2002 |
| JP | 2007-110039 A | 4/2007 |
| JP | 2012-248609 A | 12/2012 |
| WO | 2006/103767 A1 | 10/2006 |
| WO | 2009/028079 A1 | 3/2009 |
| WO | 2010/146706 A1 | 12/2010 |

OTHER PUBLICATIONS

International Search Report; PCT/JP2012/081272; Apr. 2, 2013.

*Primary Examiner* — Xinning Niu
(74) *Attorney, Agent, or Firm* — Studebaker & Brackett PC

(57) ABSTRACT

A waveguide is constructed by sandwiching a transparent member (4) and a laser medium (5) between a first clad 3-1 and a second clad 3-2. Pumping light (8) is made to be incident from a direction perpendicular to a direction of the optical axes of first to fourth laser oscillation light beams 9-1 to 9-4, and to alternately propagate through the transparent member (4) and the laser medium (5) in a zigzag manner so as to pump only resonator mode regions in the laser medium (5).

14 Claims, 9 Drawing Sheets

(51) Int. Cl.
*H01S 3/042* (2006.01)
*H01S 3/06* (2006.01)
*H01S 3/094* (2006.01)
*H01S 3/109* (2006.01)
*H01S 3/08* (2006.01)
*H01S 3/16* (2006.01)
*H01S 3/17* (2006.01)
*H01S 3/23* (2006.01)

(56) References Cited

U.S. PATENT DOCUMENTS

| | | | |
|---|---|---|---|
| 2003/0072343 A1 | 4/2003 | Murray et al. | |
| 2007/0248136 A1* | 10/2007 | Leonardo et al. | 372/55 |
| 2008/0025362 A1* | 1/2008 | Yamamoto et al. | 372/75 |
| 2008/0095202 A1* | 4/2008 | Yanagisawa et al. | 372/19 |
| 2010/0303112 A1 | 12/2010 | Yamamoto et al. | |

* cited by examiner

PLANAR WAVEGUIDE LASER PUMPING MODULE AND PLANAR WAVEGUIDE WAVELENGTH CONVERSION LASER DEVICE

FIELD OF THE INVENTION

The present invention relates to a planar waveguide laser pumping module suitable for use as a light source for laser projectors, and a planar waveguide wavelength conversion laser device using the planar waveguide laser pumping module.

BACKGROUND OF THE INVENTION

Light sources of three colors: red, green, and blue are required for laser projectors. A wavelength conversion laser device that generates a second harmonic wave by using laser light in a 1 μm, band as fundamental laser light has been developed as the green one of these light sources. This light source needs to be small because it is mounted in laser projectors. Further, high-power light sources are required for projectors which require high brightness. In addition, low power consumption is required, and it is necessary to make the light sources operate with a high degree of efficiency.

As a method of implementing a wavelength conversion laser device that satisfies the above-mentioned requirements, a mode control waveguide laser device disclosed by, for example, patent reference 1 has been provided conventionally. The mode control waveguide laser device disclosed by patent reference 1 is comprised of a planar laser medium, two clads that sandwiches the laser medium therebetween, and a heat sink joined to one of the clads. The laser medium has a periodic lens effect, and has a laser oscillation in a waveguide mode of the laser medium, and laser oscillations in a plurality of resonator modes which are formed by the periodic lens effect of the laser medium. As a method of generating the lens effect, the reference shows a method of shaping the heat sink in such a way that the heat sink has a periodic comb structure, and making the pumping light be incident upon a region of the laser medium which is not joined to the heat sink, thereby generating a heat distribution in the laser medium to generate a refractive index distribution.

Further, as a method for providing high power, a solid state laser pumping module disclosed by patent reference 2 has been provided. The solid state laser pumping module disclosed by patent reference 2 is comprised of a solid state laser medium whose front and rear surfaces in a direction of its thickness are set as a laser light incidence surface and an exhaust heat surface, respectively, and an undoped medium optically joined to the laser light incidence surface of the solid state laser medium. The reference shows a structure in which a total reflection film that reflects laser light propagating through the solid state laser medium is disposed on the exhaust heat surface of the solid state laser medium and an antireflection film is disposed on the undoped medium joined to the laser light incidence surface, and pumping light is made to be incident upon a side surface of the thin plate-shaped solid state laser medium so as to oscillate a laser from a direction of the thickness of the solid state laser medium.

RELATED ART DOCUMENTS

Patent References

Patent reference 1: WO No. 2006/103767
Patent reference 2: Japanese Unexamined Patent Application Publication No. 2007-110039

SUMMARY OF THE INVENTION

Problems to be Solved by the Invention

In a conventional mode control waveguide laser device as disclosed by above-mentioned patent reference 1, an end surface pumping method is used, and the oscillation light axis matches with the pumping light axis. In this case, the output power in each mode is limited by the output power per one emitter of the semiconductor laser, and it is therefore difficult to increase the output power. Further, it is necessary to make the beam spacing of the pumping light match the spacing between the comb teeth of the heat sink, and the beam spacing is limited. A further problem is that because light spreading over the comb teeth of the heat sink due to the angle of divergence of the semiconductor laser which is the pumping light source does not contribute to the laser oscillation, the beam overlap efficiency degrades.

On the other hand, the use of a side surface pumping method of making the pumping light be incident in a direction perpendicular to the oscillation light axis provides an advantage of being able to increase the output power in each mode because many semiconductor lasers are arranged along a direction of the optical axis of the laser oscillation light and along a lateral direction with respect to the optical axis. A problem is, however, that because a region other than the resonator modes is pumped, the beam overlap efficiency degrades.

In addition, in a conventional disc type solid state laser pumping module as disclosed by above-mentioned patent reference 2, a laser oscillation is performed in a direction of the thickness of the laser medium. A problem is therefore that because the thickness of the disc laser is typically of order of about hundreds of μm, and therefore it is difficult to provide a high gain and the solid state laser pumping module has high sensitivity to variations in the resonator loss, the laser operation becomes unstable easily.

The present invention is made in order to solve the above-mentioned problems, and it is therefore an object of the present invention to provide a planar waveguide laser pumping module having high output power and high beam overlap efficiency, and a planar waveguide wavelength conversion laser device having high power and high beam overlap efficiency.

Means for Solving the Problem

In accordance with the present invention, there is provided a planar waveguide laser pumping module including: a planar laser medium; a planar transparent member that has a refractive index equal to that of the laser medium, and that is joined to a surface of the laser medium; a first clad that has a refractive index smaller than those of the laser medium and the transparent member, and that is joined to a surface opposite to the surface of the transparent member joined to the laser medium; a second clad that has a refractive index smaller than those of the laser medium and the transparent member, that is joined to a surface opposite to the surface of the laser medium joined to the transparent member, and that sandwiches the transparent member and the laser medium between itself and the first clad; and a heat sink that is joined to the laser medium via the second clad, in which laser oscillations occur on a plurality of optical axes which are arranged at spacings in a planar direction, and pumping light is incident in a direction perpendicular to the optical axes of the laser oscillations, and alternately propagates on the plurality of optical axes of the laser medium and in the transparent member.

In accordance with the present invention, there is provided a planar waveguide wavelength conversion laser device including: the above-mentioned planar waveguide laser pumping module; and a wavelength conversion element that converts a wavelength of laser oscillation light outputted from the planar waveguide laser pumping module.

Advantages of the Invention

Because in accordance with the present invention, the pumping light is incident in a direction perpendicular to the optical axes of the laser oscillations and alternately propagates on the plurality if optical axes in the laser medium and in the transparent member, many light sources of the pumping light can be arranged along the optical axis of the laser oscillation, and therefore the output power can be increased. Further, because only the regions of the resonator modes in the laser medium are pumped, high beam overlap efficiency can be acquired. Therefore, a planar waveguide laser pumping module having high output power and high beam overlap efficiency, and a planar waveguide wavelength conversion laser device using this planar waveguide laser pumping module can be provided.

EMBODIMENTS OF THE INVENTION

Hereafter, in order to explain this invention in greater detail, the preferred embodiments of the present invention will be described with reference to the accompanying drawings.

Embodiment 1

Figure 1:
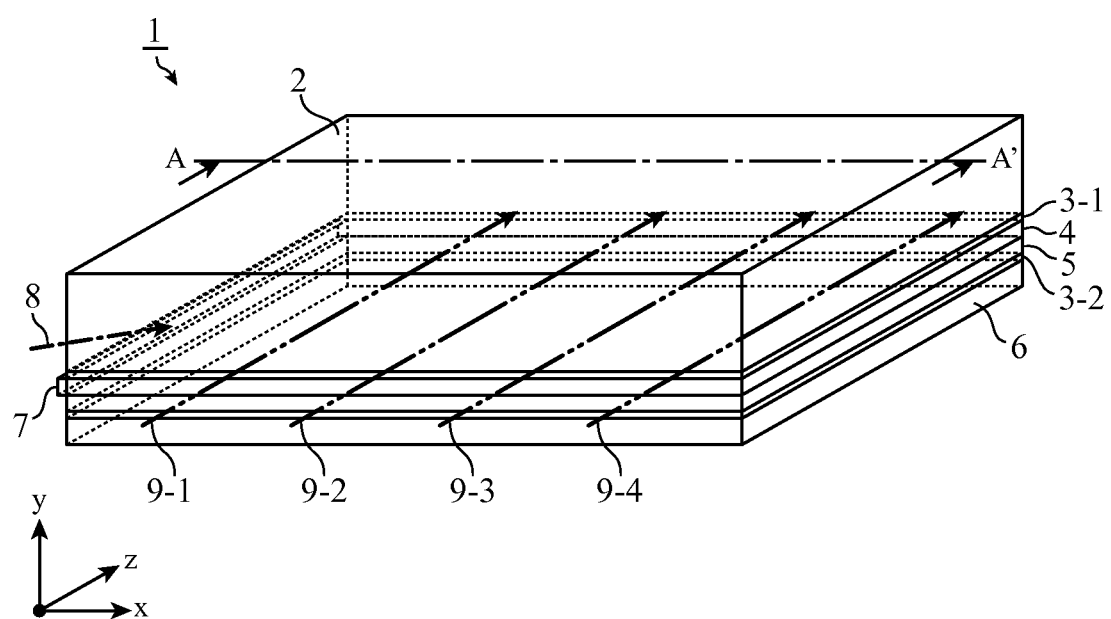
FIG. 1 is an appearance perspective view showing the structure of a planar waveguide laser pumping module in accordance with Embodiment 1 of the present invention.

As shown in FIG. 1, in a planar waveguide laser pumping module 1 in accordance with this Embodiment 1, a reinforcement board 2, a first clad 3-1, a transparent member 4, a laser medium 5, a second clad 3-2, and a heat sink 6 are laminated in a direction of the thickness, and an end surface 4a of the transparent member 4 upon which pumping light 8 is incident is covered by a pumping light antireflection member 7. In the figure, a dashed dotted line denotes the pumping light 8, and chain double-dashed lines denote first to fourth laser oscillation light beams 9-1 to 9-4.

Figure 2:
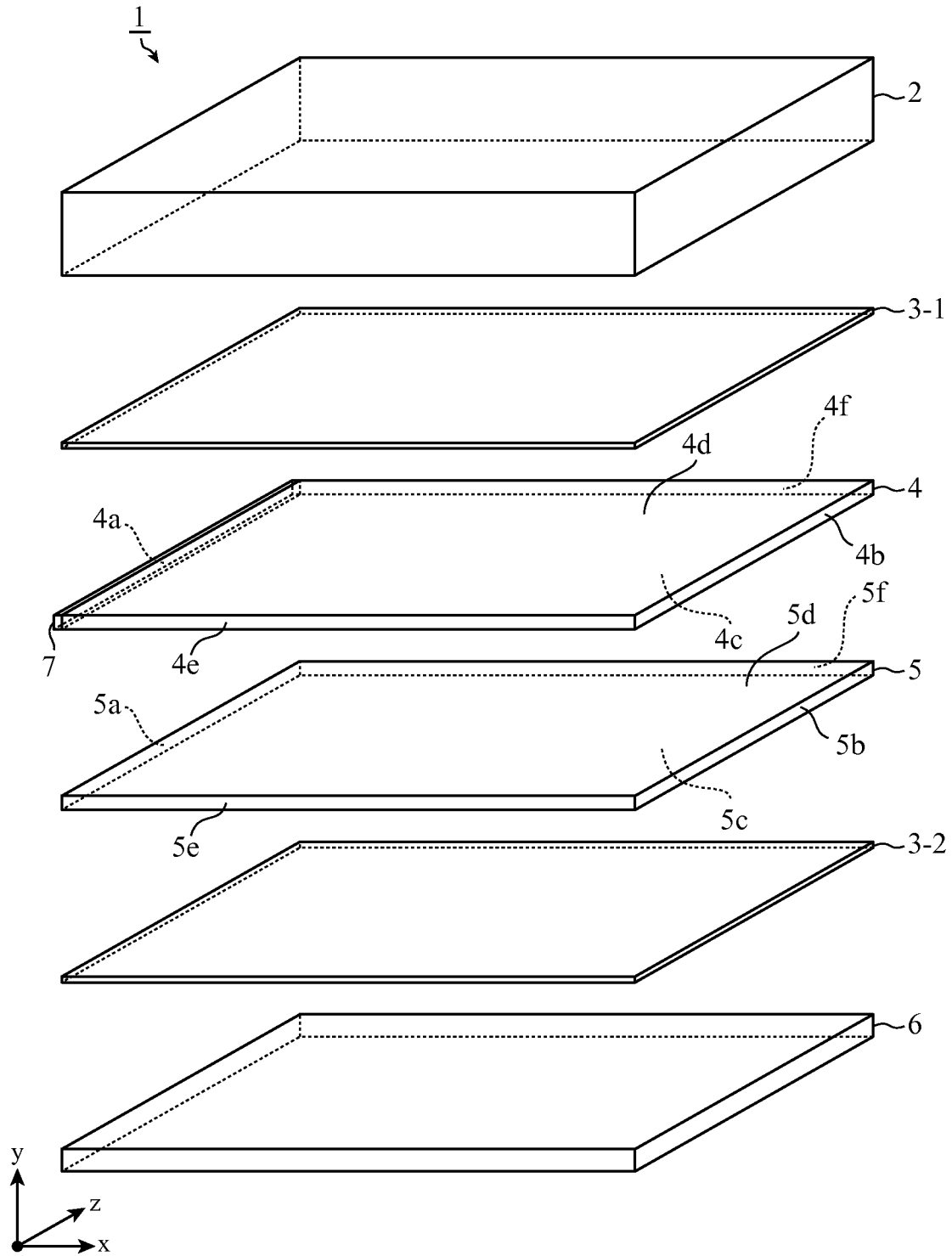
FIG. 2 is an exploded perspective view of the planar waveguide laser pumping module in accordance with Embodiment 1.

A perspective view in which the planar waveguide laser pumping module 1 in accordance with this Embodiment 1 is exploded in the thickness direction is shown in FIG. 2. Hereafter, for purposes of illustration, a direction of the optical axis of the pumping light 8 is defined as x, the thickness direction of the planar waveguide laser pumping module 1 is defined as y, and a direction of the optical axis of each of the first to fourth laser oscillation light beams 9-1 to 9-4 is defined as z, and a coordinate system in which the x, y, and z axes intersect one another at right angles is used.

Because in this planar waveguide laser pumping module 1 the thickness in the thickness direction y of a waveguide which is constructed of the transparent member 4 and the laser medium 5 which are sandwiched between the first clad 3-1 and the second clad 3-2 is thin, the strength of the waveguide is reinforced by using the plate-like reinforcement board 2. It is preferable to use a material having a coefficient of thermal expansion close to that of the laser medium 5 as this reinforcement board 2 in order to reduce the curvature of the laser medium 5 at a time of bonding the reinforcement board to the laser medium 5. In a case in which the module has adequate stiffness with only the waveguide, it is not necessary to dispose the reinforcement board 2.

For example, in a case of using Nd:YAG, Yb:YAG, or Er:YAG as the laser medium 5, undoped YAG having a coefficient of thermal expansion (about $7.8 \times 10^{-6}$/K) close to that of the reinforcement board 2 can be used.

As an alternative, in a case of using Nd:YVO$_4$, Yb:YVO$_4$, or Er:YVO$_4$ (its coefficient of thermal expansion in a direction of the a axis is about $1.7 \times 10^{-6}$/K, and its coefficient of thermal expansion in a direction of the c axis is about $8.2 \times 10^{-6}$/K) as the laser medium 5, undoped YVO$_4$ whose crystallographic axis is the same direction can be used as the reinforcement board 2.

As an alternative, in a case of using Nd:YLF or Er:YLF (its coefficient of thermal expansion in a direction of the a axis is about $13.3 \times 10^{-6}$/K, and its coefficient of thermal expansion in a direction of the c axis is about $8.3 \times 10^{-6}$/K) as the laser medium 5, undoped YLF having the same axial direction can be used as the reinforcement board 2.

As an alternative, in a case of using Nd:glass, Yb:glass, or Er:glass (its coefficient of thermal expansion is about $9 \times 10^{-6}$/K) as the laser medium 5, undoped glass having a close coefficient of thermal expansion can be used as the reinforcement board 2.

In the first clad 3-1, an upper surface in the thickness direction y is in contact with the reinforcement board 2 and a lower surface is in contact with an end surface 4d of the transparent member 4. In the second clad 3-2, an upper surface in the thickness direction y is in contact with an end surface 5c of the laser medium 5, and a lower surface is in contact with the heat sink 6. These first and second clads 3-1 and 3-2 have a function of confining the pumping light 8 and the first to fourth laser oscillation light beams 9-1 to 9-4 within the transparent member 4 and the laser medium 5. A material having a refractive index lower than those of the transparent member 4 and the laser medium 5 is used as each of the first and second clads 3-1 and 3-2.

For example, in a case of using Nd:YAG, Yb:YAG, or Er:YAG (its refractive index is 1.83) as the laser medium 5, alumina ($AlO_3$, its refractive index is 1.61) or $M_3$ (its refractive index is 1.73) can be used as each of the first and second clads 3-1 and 3-2.

As an alternative, in a case of using Nd:$YVO_4$, Yb:$YVO_4$, or Er:$YVO_4$ as the laser medium 5, tantalum pentoxide ($Ta_2O_5$) can be used as each of the first and second clads 3-1 and 3-2.

As an alternative, in a case of using Nd:YLF or Er:YLF (its refractive index is about 1.47) as the laser medium 5, $SiO_2$ (its refractive index is 1.45) can be used as each of the first and second clads 3-1 and 3-2.

As an alternative, in a case of using Nd:glass, Yb:glass, or Er:glass (its refractive index is 1.56) as the laser medium 5, $SiO_2$ (its refractive index is 1.45) can be used as each of the first and second clads 3-1 and 3-2.

The transparent member 4 is formed in a flat plate shape, and has the end surface 4a upon which the pumping light 8 is incident, and end surfaces 4b to 4f. The end surfaces 4a and 4b have a perpendicular positional relationship with the pumping light 8 and a parallel positional relationship with the first to fourth laser oscillation light beams 9-1 to 9-4, and are opposite to each other. The end surfaces 4c and 4d of the transparent member 4 have a parallel positional relationship with the pumping light 8 and the first to fourth laser oscillation light beams 9-1 to 9-4, and are opposite to each other. Further, the end surface 4c is in contact with an end surface 5d of the laser medium 5, and the end surface 4d is in contact with the first clad 3-1. The end surfaces 4e and 4f of the transparent member 4 have a parallel positional relationship with the pumping light 8 and a perpendicular positional relationship with the first to fourth laser oscillation light beams 9-1 to 9-4, and are opposite to each other.

As this transparent member 4, a material which allows the pumping light 8 and the first to fourth laser oscillation light beams 9-1 to 9-4 to pass therethrough, and which has a coefficient of thermal expansion which is substantially the same as that of the laser medium 5 in order to prevent a crack due to a stress at the time of being joined is used. Further, as the material of the transparent member 4, a material having a refractive index equal to or lower than that of the laser medium 5 is used. A concrete example of the material will be mentioned below.

The pumping light antireflection member 7 is disposed on the end surface 4a of this transparent member 4. The pumping light antireflection member 7 has a function of allowing the pumping light 8 reaching the end surface 4a of the transparent member 4 from outside the module to be incident upon the inside of the transparent member 4 without a loss. As this pumping light antireflection member 7, for example, a dielectric film or the like can be used. Further, in a case in which the angle of incidence of the pumping light 8 to the end surface 4a is a Brewster angle, the pumping light antireflection member 7 can be eliminated.

For purposes of illustration, in the figure, the pumping light antireflection member 7 is shown exaggeratedly and enlargely, and has a contraction scale different from an actual one.

The laser medium 5 is formed in a planar shape, and has end surfaces 5a to 5d, and 5f, and an end surface 5e upon which the first to fourth laser oscillation light beams 9-1 to 9-4 are incident. The end surfaces 5a and 5b have a perpendicular positional relationship with the pumping light 8 and a parallel positional relationship with the first to fourth laser oscillation light beams 9-1 to 9-4, and are opposite to each other. The end surfaces 5c and 5d of the laser medium 5 have a parallel positional relationship with the pumping light 8 and the first to fourth laser oscillation light beams 9-1 to 9-4, and are opposite to each other. Further, the end surface 5d is in contact with the end surface 4c of the transparent member 4, and the end surface 5c is in contact with the second clad 3-2. The end surfaces 5e and 5f of the laser medium 5 have a parallel positional relationship with the pumping light 8 and a perpendicular positional relationship with the first to fourth laser oscillation light beams 9-1 to 9-4, and are opposite to each other.

As a material which constructs this laser medium 5, a material which absorbs the pumping light 8 and has a gain for the first to fourth laser oscillation light beams 9-1 to 9-4 is used.

For example, in a case of using Nd:YAG, Yb:YAG, or Er:YAG as the laser medium 5, undoped YAG having a close refractive index (about 1.83) and a close coefficient of thermal expansion (about $7.8 \times 10^{-6}$/K) can be used as the transparent member 4.

As an alternative, in a case of using Nd:$YVO_4$, Yb:$YVO_4$, or Er:$YVO_4$ (refractive indices (the a axis: about 1.97, the c axis: about 2.17), and coefficients of thermal expansion (in a direction of the a axis: about $1.7 \times 10^{-6}$/K, in a direction of the c axis: about $8.2 \times 10^{-6}$/K) as the laser medium 5, undoped $YVO_4$ whose crystallographic axis is the same direction can be used as the transparent member 4.

As an alternative, in a case of using Nd:YLF, Yb:YLF, or Er:YLF (refractive indices (the a axis: about 1.45, the c axis: about 1.47), and coefficients of thermal expansion (in a direction of the a axis: about $13.3 \times 10^{-6}$/K, in a direction of the c axis: about $8.3 \times 10^{-6}$/K) as the laser medium 5, undoped YLF whose crystallographic axis is the same direction can be used as the transparent member 4.

As an alternative, in a case of using Nd:glass, Yb:glass, or Er:glass (its refractive index is 1.56 and its coefficient of thermal expansion is $9 \times 10^{-6}$/K), undoped glass can be used as the transparent member 4.

It is preferable to dope active ions, such as Nd, into the host material, such as YAG, to construct the laser medium 5, and construct the transparent member 4 by using this host material in this way.

Further, the transparent member 4 and the laser medium 5 are constructed of materials having an equal refractive index, and the end surface 4c of the transparent member 4 and the end surface 4d of the laser medium 5 are optically joined to each other, so that a waveguide is formed between the first clad 3-1 and the second clad 3-2 and the pumping light 8 and the first to fourth laser oscillation light beams 9-1 to 9-4 are confined within the waveguide.

In a case in which the transparent member 4 is constructed by using a material having a lower refractive index than that of the laser medium 5, the first to fourth laser oscillation light beams 9-1 to 9-4 can be confined between the second clad 3-2 and the end surface 4c of the transparent member 4. Further, in this case, by adjusting the difference in the refractive index between the transparent member 4 and the laser medium 5, the number of waveguide modes of the first to fourth laser oscillation light beams 9-1 to 9-4 can be varied.

As a means for optically joining the transparent member 4 and the laser medium 5 to each other, for example, there is a method of integrally sintering a ceramic material which constructs the transparent member 4 and a ceramic material which constructs the laser medium 5 to join the transparent member 4 and the laser medium 5 to each other. As an alternative, there is a method of integrally joining the transparent member 4 and the laser medium 5 to each other by using diffusion bonding. As an alternative, there is a method of integrally joining the transparent member 4 and the laser medium 5 to each other by using surface activated bonding. As an alternative, there is a method of integrally joining the transparent member 4 and the laser medium 5 to each other by using an optical contact. As an alternative, there is a method of integrally bonding the transparent member 4 and the laser medium 5 to each other by using an optical adhesive.

The heat sink 6 is formed in a flat plate shape, and is joined to the lower surface of the second clad 3-2. As a material which constructs the heat sink 6, a material superior in heat conductivity and having a coefficient of thermal expansion close to that of the reinforcement board 2 is preferable.

For example, in a case of using Nd:YAG, Yb:YAG, or Er:YAG as the laser medium 5, and using undoped YAG having a coefficient of thermal expansion close to that (about $7.8\times10^{-6}$/K) of the laser medium 5 as the reinforcement board 2, CuW having a heat conductivity of about 160 to 230 W/m and a coefficient of thermal expansion of about 6.4 to $8.3\times10^{-6}$/K can be used as the heat sink 6.

As an alternative, in a case of using Nd:YVO$_4$, Yb:YVO$_4$, or Er:YVO$_4$ as the laser medium 5, and using undoped YVO$_4$ as the reinforcement board 2, AlN having a heat conductivity of about 150 to 200 W/m and a coefficient of thermal expansion of about $4.5\times10^{-6}$/K can be used as the heat sink 6.

As an alternative, in a case of using Nd:YLF or Er:YLF as the laser medium 5, Al—SiC having a heat conductivity of about 150 to 200 W/m and a coefficient of thermal expansion of about 8 to $15\times10^{-6}$/K with respect to a direction parallel to the a-axis (a coefficient of thermal expansion of about $13.3\times10^{-6}$/K), Cu having a heat conductivity of about 394 W/m and a coefficient of thermal expansion of about $17\times10^{-6}$/K, or CuW having a heat conductivity of about 160 to 230 W/m and a coefficient of thermal expansion of about 6.4 to $8.3\times10^{-6}$/K with respect to a direction parallel to the c-axis (a coefficient of thermal expansion of about $8.3\times10^{-6}$/K) can be used as the heat sink 6.

As an alternative, in a case of using Nd:glass, Yb:glass, or Er:glass as the laser medium 5, and using undoped glass having a coefficient of thermal expansion close to that (about $9.0\times10^{-6}$/K) of the laser medium 5 as the reinforcement board 2, CuW having a heat conductivity of about 160 to 230 W/m and a coefficient of thermal expansion of about 6.4 to $8.3\times10^{-6}$/K can be used as the heat sink 6.

The pumping light 8 denoted by a dashed dotted line in FIG. 1 has a wavelength which the laser medium 5 absorbs, and is incident upon the inside of the transparent member 4 from the end surface 4a via the pumping light antireflection member 7. As the light source of the pumping light 8, for example, a semiconductor laser or a fiber laser can be used. Because it is possible to place this light source along the direction x of the optical axes of the first to fourth laser oscillation light beams 9-1 to 9-4, the power of the pumping light 8 can be increased by using either a broad area semiconductor laser capable of outputting high power and having a wide light emitting area or a semiconductor laser array, capable of outputting high power, in which emitters are arranged in a row.

The light source of the pumping light 8 can be placed close to the end surface 4a of the transparent member 4. Further, a collimate lens can be installed between the light source of the pumping light 8 and the end surface 4a so as to make the pumping light 8 be collimated light and make this collimated light be incident upon the end surface 4a.

Next, the operation of the planar waveguide laser pumping module 1 will be explained.

Figure 3:
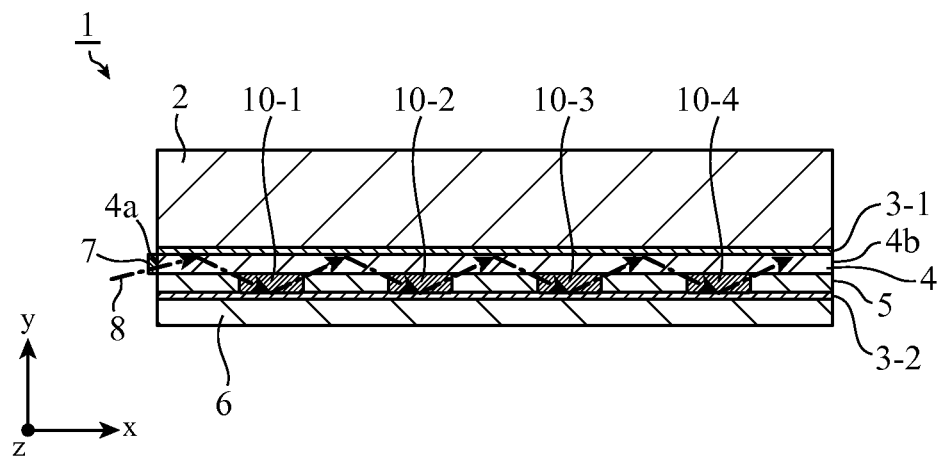
FIG. 3 is a cross-sectional view taken along the A-A' line of FIG. 1 of the planar waveguide laser pumping module in accordance with Embodiment 1.

FIG. 3 is a cross-sectional view, taken along the A-A' line of FIG. 1, of the planar waveguide laser pumping module 1 in accordance with this Embodiment 1. As shown in FIG. 3, the pumping light 8 passes through the pumping light antireflection member 7 and is incident upon the inside of the transparent member 4 from the end surface 4a of the transparent member 4, and advances toward a direction of the first clad 3-1. Next, when reaching the interface between the first clad 3-1 and the transparent member 4, the pumping light 8 is reflected, propagates through the transparent member 4 and the laser medium 5 in that order toward the laser medium 5, and a part of the pumping light 8 is absorbed by the laser medium 5. Then, when reaching the interface between the second clad 3-2 and the laser medium 5, the pumping light 8 is reflected and propagates through the laser medium 5 and the transparent member 4 in that order toward the transparent member 4. The pumping light 8 propagates between the first clad 3-1 and the second clads 3-2 in a zigzag manner and is absorbed every time when passing through the laser medium 5 in this way.

At this time, by adjusting the ratio of the thickness of the transparent member 4 and that of the laser medium 5 and a propagation angle in the waveguide of the pumping light 8, the pumping light 8 propagating through the transparent member 4 and the laser medium 5 in a zigzag manner is made to propagate in such a way as to pass through first to fourth resonator mode regions 10-1 to 10-4 in the laser medium 5. The first to fourth resonator mode regions 10-1 to 10-4 can be formed by using, for example, a resonator mode controlling unit 48 in accordance with Embodiment 5 which will be mentioned below.

Figure 4:
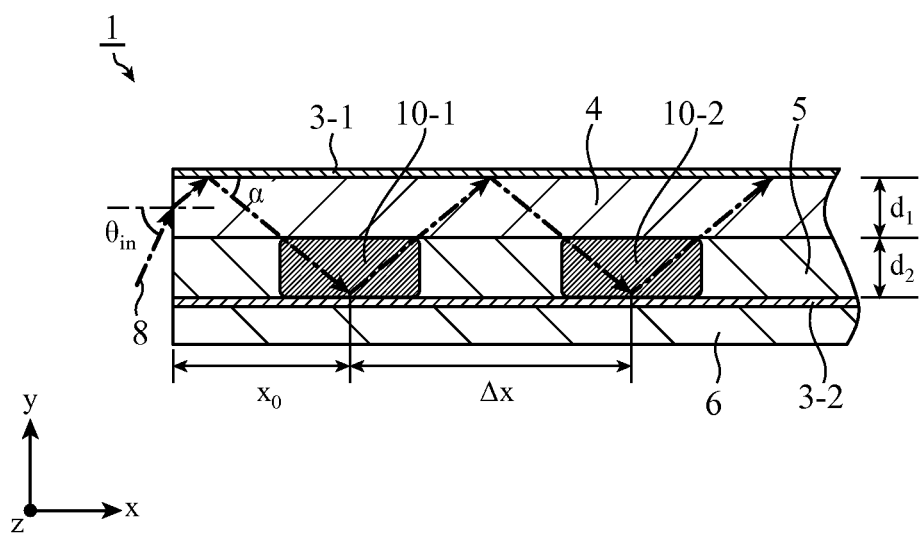
FIG. 4 is a cross-sectional view showing an enlarged part of the planar waveguide laser pumping modules shown in FIG. 3.

Next, a method of deriving the waveguide propagation angle α which is required for the pumping light 8 propagating through the transparent member 4 and the laser medium 5 in a zigzag manner to pass through the first to fourth resonator mode regions 10-1 to 10-4 in the laser medium 5 will be explained with reference to FIG. 4. The illustration of the reinforcement board 2 and the pumping light antireflection member 7 is omitted in FIG. 4.

When the thickness of the transparent member 4 is denoted by $d_1$, the thickness of the laser medium 5 is denoted by $d_2$, the spacing between the first to fourth resonator mode regions 10-1 to 10-4 is denoted by $\Delta x$, and the distance from the end surface 5a of the laser medium 5 to the center of the first resonator mode region 10-1 is denoted by $x_0$, the waveguide propagation angle α is expressed by the following equation (1).

$$\alpha = \tan^{-1}(\Delta x/(2\times(d_1+d_2))) \tag{1}$$

It is assumed that the refractive indices of the transparent member 4 and the laser medium 5 are equal, and the pumping light 8 is collimated light which is made to pass through the collimate lens.

Further, when the refractive index of the transparent member 4 is denoted by n, the angle of incidence $\theta_{in}$ of the pumping light 8 to the end surface 4a of the transparent member 4 at this time is expressed by the following equation (2). This waveguide propagation angle $\alpha$ is an angle of inclination to a plane (i.e., an xz plane) including the first to fourth laser oscillation light beams 9-1 to 9-4.

$$\theta_{in}=\sin^{-1}(n\times\sin(\tan^{-1}(\Delta x/(2\times(d_1+d_2))))) \quad (2)$$

Further, the distance $x_0$ from the end surface 5a of the laser medium 5 to the center of the first resonator mode region 10-1 is expressed by the following equation (3).

$$x_0=(1.5\times d_1+d_2)\times\tan\alpha \quad (3)$$

The equation (3) shows a case in which the position where the pumping light 8 is incident upon the end surface 4a is the center in the direction y of the thickness of the transparent member 4, and the pumping light 8 is incident toward the first clad 3-1. In contrast with this, when the pumping light 8 is incident toward the second clad 3-2, the distance can be expressed by the following equation (4).

$$x_0=(0.5\times d_1+d_2)\times\tan\alpha \quad (4)$$

For example, in a case in which the transparent member 4 is constructed of undoped $YVO_4$ having a thickness of 5 μm, the laser medium 5 is constructed of $Nd:YVO_4$ having a thickness of 5 μm, and the spacing between the first to fourth resonator mode regions 10-1 to 10-4 is 50 μm, it is estimated from the above equations (1) and (2) that the waveguide propagation angle $\alpha$ is 21.8 degrees and the angle of incidence $\theta_{in}$ is 54.4 degrees because the refractive index at a wavelength of 1 μm of $YVO_4$ is 2.19. At this time, it is estimated from the above equation (3) that the distance $x_0$ from the end surface 5a of the laser medium 5 to the first resonator mode region 10-1 is 31.25 μm when the pumping light 8 is incident toward the first clad 3-1, and it is estimated from the above equation (4) that the distance $x_0$ is 18.75 μm when the pumping light 8 is incident toward the second clad 3-2.

Although the case in which there are four resonator mode regions is shown in the illustrated example, by adjusting the ratio of the thickness $d_1$ of the transparent member 4 and that $d_2$ of the laser medium 5 or the waveguide propagation angle $\alpha$ of the pumping light 8 even if the number of resonator mode regions is varied, the pumping light 8 can be made to propagate in such a way as to pass through the resonator mode regions in the laser medium 5.

As mentioned above, the planar waveguide laser pumping module 1 in accordance with Embodiment 1 is constructed in such a way that the planar waveguide laser pumping module includes: the planar laser medium 5; the planar transparent member 4 that has a refractive index equal to that of the laser medium 5, and that is joined to the end surface 5d of the laser medium 5; the first clad 3-1 that has a refractive index smaller than those of the laser medium 5 and the transparent member 4, and that is joined to the end surface 4d of the transparent member 4; the second clad 3-2 that has a refractive index smaller than those of the laser medium 5 and the transparent member 4, and that is joined to the end surface 5c of the laser medium 5, and that sandwiches the transparent member 4 and the laser medium between itself and the first clad 3-1; and the heat sink 6 that is joined to the laser medium 5 via the second clad 3-2, and the first to fourth laser oscillation light beams 9-1 to 9-4 oscillate in the periodic first to fourth resonator mode regions 10-1 to 10-4 of the laser medium 5, and the pumping light 8 advances in the direction x of the optical axis of the pumping light 8, the direction being perpendicular to the direction z of the optical axes of the first to fourth laser oscillation light beams 9-1 to 9-4, and alternately propagates through the periodic first to fourth resonator mode regions 10-1 to 10-4 of the laser medium 5, and the transparent member 4 in a zigzag manner. Therefore, because many light sources of the pumping light can be arranged along the optical axis of the laser oscillation, the output power can be increased. Further, because only the regions of the resonator modes in the laser medium are pumped, high beam overlap efficiency can be acquired. Therefore, a planar waveguide laser pumping module having high output power and high beam overlap efficiency, and a planar waveguide wavelength conversion laser device using this planar waveguide laser pumping module can be provided.

Embodiment 2

Figure 5:
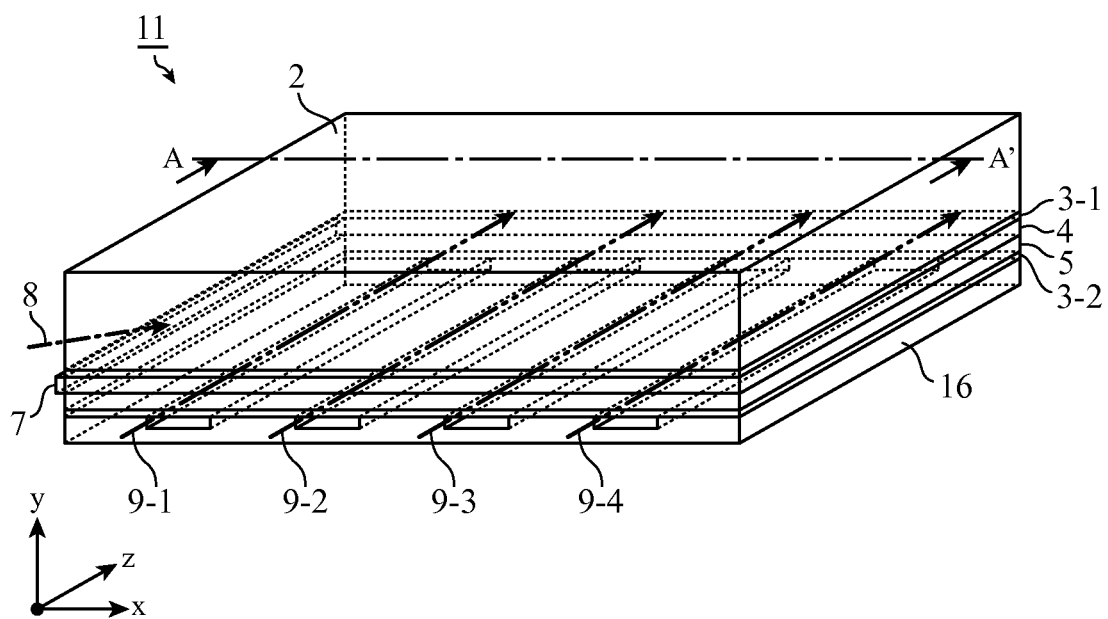
FIG. 5 is an appearance perspective view showing the structure of a planar waveguide laser pumping module in accordance with Embodiment 2 of the present invention.
Figure 6:
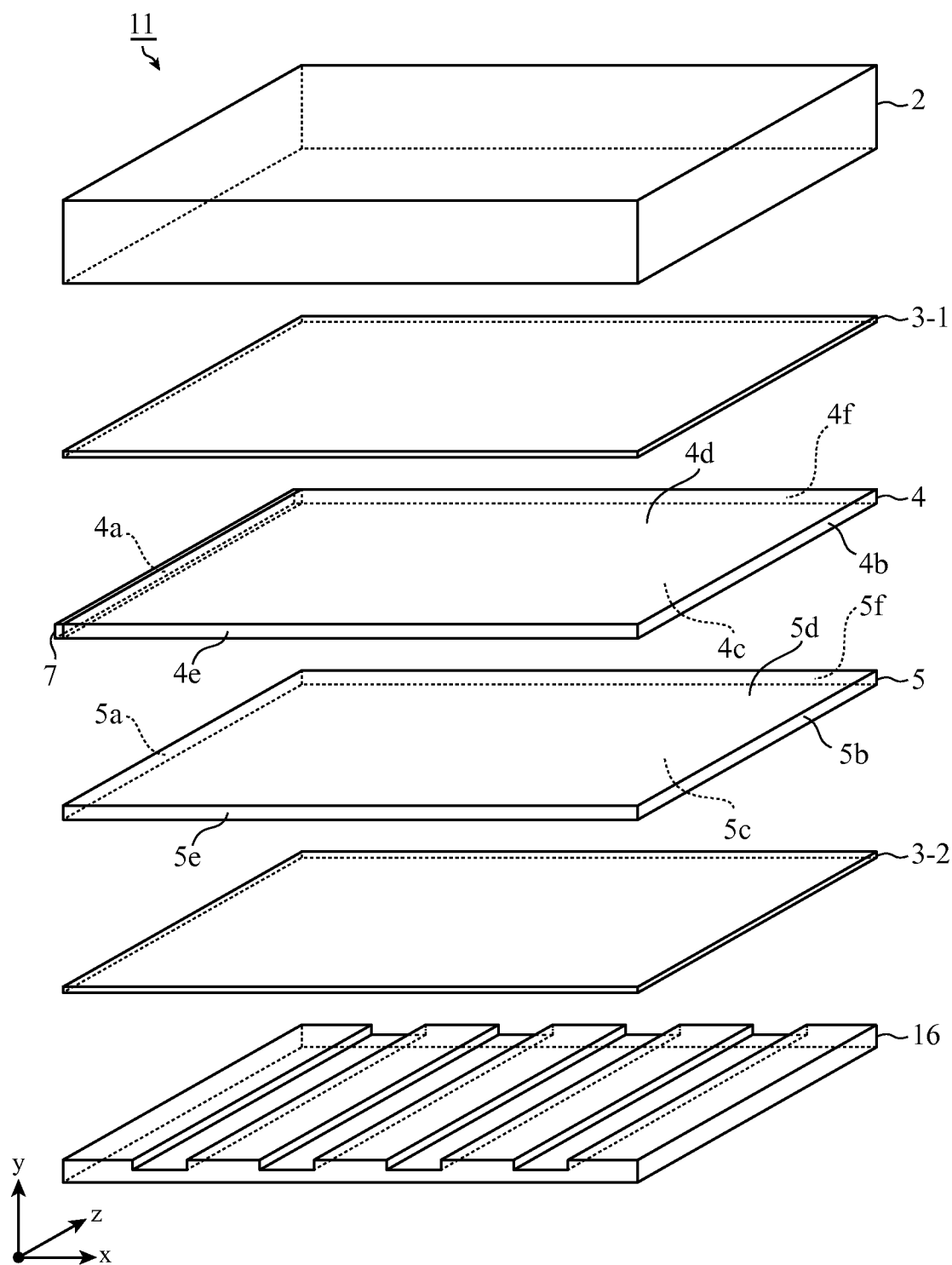
FIG. 6 is an exploded perspective view of the planar waveguide laser pumping module in accordance with Embodiment 2.

FIG. 5 is an appearance perspective view showing the structure of a planar waveguide laser pumping module 11 in accordance with this Embodiment 2, and FIG. 6 is an exploded perspective view of the module. As shown in FIGS. 5 and 6, in the planar waveguide laser pumping module 11 in accordance with this Embodiment 2, a reinforcement board 2, a first clad 3-1, a transparent member 4, a laser medium 5, a second clad 3-2, and a heat sink 16 are laminated in a direction y of the thickness, and an end surface 4a of the transparent member 4 upon which pumping light 8 is incident is covered by a pumping light antireflection member 7. In the figures, a dashed dotted line denotes the pumping light 8, and chain double-dashed lines denote first to fourth laser oscillation light beams 9-1 to 9-4.

Because the structure of the planar waveguide laser pumping module 11 in accordance with this Embodiment 2 is the same as that of the planar waveguide laser pumping module 1 in accordance with above-mentioned Embodiment 1 except for the heat sink 16, the same components as those shown in FIGS. 1 and 2 or like components are designated by the same reference numerals in FIGS. 5 and 6, and the explanation of the components will be omitted hereafter.

In the planar waveguide laser pumping module 11, the heat sink 16 has a plurality of grooves in a linear shape which are formed at intervals in such a way as to extend in a direction parallel to a direction z of the optical axis of the first to fourth laser oscillation light beams 9-1 to 9-4, and perpendicular to a direction x of the optical axis of the pumping light 8, and has a comb structure in which a surface part joined to the second clad 3-2 and a surface part non-joined to the second clad 3-2 alternately exist at intervals. In the illustrated example, four grooves having a comb structure are formed according to the number of resonator mode regions. As a material which constructs this heat sink 16, a material superior in heat conductivity and having a coefficient of thermal expansion close to that of the reinforcement board 2 is preferable.

For example, in a case of using Nd:YAG, Yb:YAG, or Er:YAG as the laser medium 5, and using undoped YAG having a coefficient of thermal expansion close to that (about $7.8\times10^{-6}$/K) of the laser medium 5 as the reinforcement board 2, CuW having a heat conductivity of about 160 to 230 W/m and a coefficient of thermal expansion of about 6.4 to $8.3\times10^{-6}$/K can be used as the heat sink 16.

As an alternative, in a case of using $Nd:YVO_4$, $Yb:YVO_4$, or $Er:YVO_4$ as the laser medium 5, and using undoped $YVO_4$ as the reinforcement board 2, AlN having a heat conductivity of about 150 to 200 W/m and a coefficient of thermal expansion of about $4.5 \times 10^{-6}$/K can be used as the heat sink 16.

As an alternative, in a case of using Nd:YLF or Er:YLF as the laser medium 5, Al—SiC having a heat conductivity of about 150 to 200 W/m and a coefficient of thermal expansion of about 8 to $15 \times 10^{-6}$/K with respect to a direction parallel to the a-axis (a coefficient of thermal expansion of about $13.3 \times 10^{-6}$/K), Cu having a heat conductivity of about 394 W/m and a coefficient of thermal expansion of about $17 \times 10^{-6}$/K, or CuW having a heat conductivity of about 160 to 230 W/m and a coefficient of thermal expansion of about 6.4 to $8.3 \times 10^{-6}$/K with respect to a direction parallel to the a-axis (a coefficient of thermal expansion of about $8.3 \times 10^{-6}$/K) can be used as the heat sink 16.

As an alternative, in a case of using Nd:glass, Yb:glass, or Er:glass as the laser medium 5, and using undoped glass having a coefficient of thermal expansion close to that (about $9.0 \times 10^{-6}$/K) of the laser medium 5 as the reinforcement board 2, CuW having a heat conductivity of about 160 to 230 W/m and a coefficient of thermal expansion of about 6.4 to $8.3 \times 10^{-6}$/K can be used as the heat sink 16.

Next, the operation of the planar waveguide laser pumping module 11 will be explained.

Figure 7:
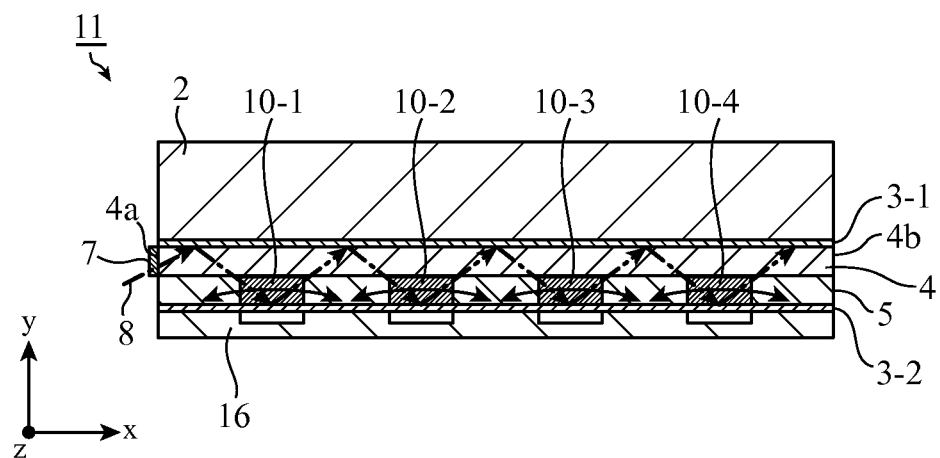
FIG. 7 is a cross-sectional view taken along the A-A' line of FIG. 5 of the planar waveguide laser pumping module in accordance with Embodiment 2.

FIG. 7 is a cross-sectional view, taken along the A-A' line of FIG. 5, of the planar waveguide laser pumping module 11 in accordance with this Embodiment 2. As shown in FIG. 7, the pumping light 8 passes through the pumping light antireflection member 7 and is incident upon the inside of the transparent member 4 from the end surface 4a of the transparent member 4, and advances toward a direction of the first clad 3-1. Next, when reaching the interface between the first clad 3-1 and the transparent member 4, the pumping light 8 is reflected, propagates through the transparent member 4 and the laser medium 5 in that order toward the laser medium 5, and a part of the pumping light 8 is absorbed by the laser medium 5. Then, when reaching the interface between the second clad 3-2 and the laser medium 5, the pumping light 8 is reflected and propagates through the laser medium 5 and the transparent member 4 in that order toward the transparent member 4. The pumping light 8 propagates between the first clad 3-1 and the second clads 3-2 in a zigzag manner and is absorbed every time when passing through the laser medium 5 in this way.

When being incident upon a non-joined region in the laser medium 5 which is not joined to the heat sink 16, the pumping light 8 is absorbed by the laser medium 5 and a part of the absorbed pumping light 8 changes to heat. The heat in the laser medium 5 which is generated by the absorption of the pumping light 8 flows into a joined region in the laser medium 5 which is joined to the heat sink 16, as shown by solid lines in FIG. 7, and generates a plurality of temperature distributions in the laser medium 5. Therefore, the temperature of each non-joined region in the laser medium 5, which is joined to the heat sink 16, is high, and the temperature decreases with decreasing distance to a joined region.

Because the refractive index of the laser medium 5 varies in approximate proportion to the difference in temperature, a refractive index distribution occurs in the laser medium 5 according to the temperature distributions shown in FIG. 7. Therefore, in a case of using a material having a positive refractive index change per unit temperature as the material of the laser medium 5, a plurality of heat lenses in which the refractive index of each non-joined region in which the laser medium 5 is not joined to the heat sink 16 is large and the refractive index decreases with decreasing distance to a joined region are produced, and the heat lenses form first to fourth resonator mode regions 10-1 to 10-4. In contrast, in a case of using a material having a negative refractive index change per unit temperature as the material of the laser medium 5, a plurality of heat lenses in which the refractive index of each non-joined region in which the laser medium 5 is not joined to the heat sink 16 is small and the refractive index increases with decreasing distance to a joined region are produced.

In this structure, by adjusting the ratio of the thickness of the transparent member 4 and that of the laser medium 5 and the propagation angle in the waveguide of the pumping light 8, like in the case of above-mentioned Embodiment 1, the pumping light 8 propagates through the transparent member 4 and the laser medium 5 in a zigzag manner in such away as to pass through the non-joined regions in the laser medium 5 which are not joined to the heat sink 16 (i.e., the first to fourth resonator mode regions 10-1 to 10-4).

Although the case in which there are four resonator mode regions is shown in the illustrated example, by adjusting the number of comb teeth of the heat sink 16, the ratio of the thickness of the transparent member 4 and that of the laser medium 5, or the waveguide propagation angle of the pumping light 8 even if the number of resonator mode regions is varied, the pumping light 8 can be made to propagate in such a way as to pass through the resonator mode regions in the laser medium 5.

As mentioned above, the planar waveguide laser pumping module 11 in accordance with Embodiment 2 is constructed in such a way as to include the heat sink 16 having a comb structure in which a plurality of grooves extending in parallel with the direction z of the optical axes of the first to fourth laser oscillation light beams 9-1 to 9-4 are formed at intervals, and generate a periodic temperature distribution in the laser medium 5 through bonding of the leading end of each comb tooth to the laser medium 5 via the second clad 3-2, thereby producing a periodic heat lens with the periodic temperature distribution. Therefore, in addition to the same advantage as that provided by above-mentioned Embodiment 1, because the resonator modes can be controlled by using the heat sink having a comb structure, an optical component for controlling the resonator modes (for example, a resonator mode controlling unit 48 which will be mentioned below) becomes unnecessary, and the component count can be reduced and the loss in the resonator can be suppressed. Further, because it is not necessary to make the beam spacing of the pumping light match the spacing between the comb teeth of the heat sink, unlike in the case of a conventional planar waveguide laser pumping module having a comb structure in which a heat sink has a periodic shape, the spacing between the comb teeth of the heat sink can be set freely, and the degree of freedom of both the adjustment of the heat generation distribution and the design of a pumping width is improved. Therefore, the output power can be increased and the laser resonator can be stabilized. In addition, although a pumping light component spreading over the comb teeth of the heat sink does not contribute to the laser, even if the pumping light spreads, the pumping light spreads in a direction of the optical axis of the laser oscillation and a beam overlap is easily achieved because the pumping light is made to be incident in a direction perpendicular to the direction of the optical axis of the laser oscillation in this Embodiment 2.

Embodiment 3

Figure 8:
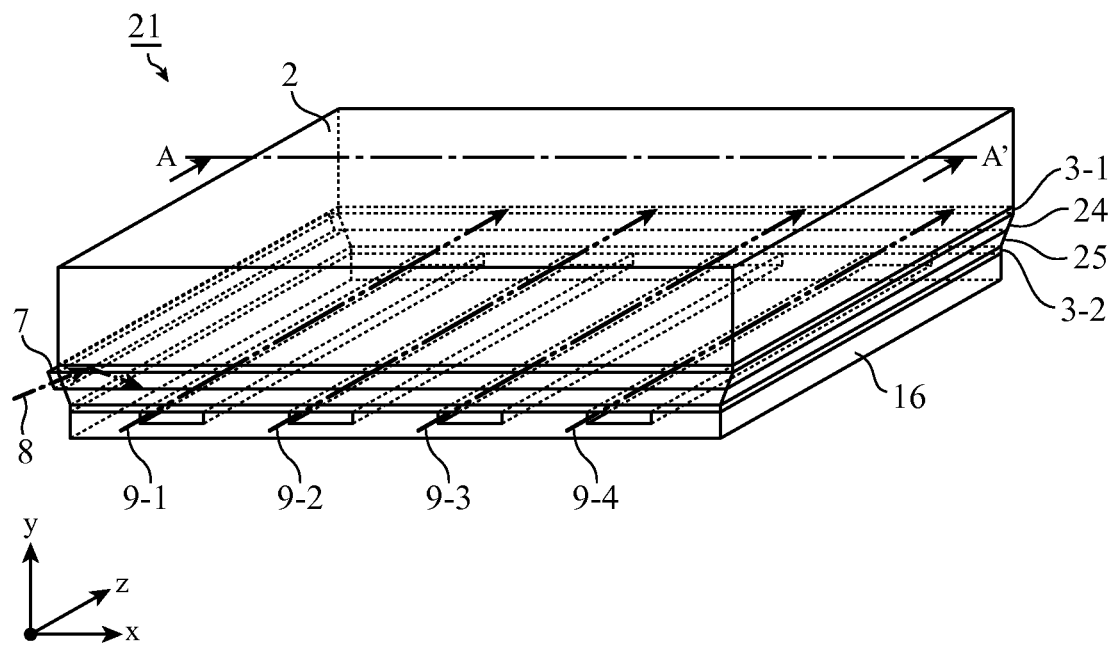
FIG. 8 is an appearance perspective view showing the structure of a planar waveguide laser pumping module in accordance with Embodiment 3 of the present invention.
Figure 9:
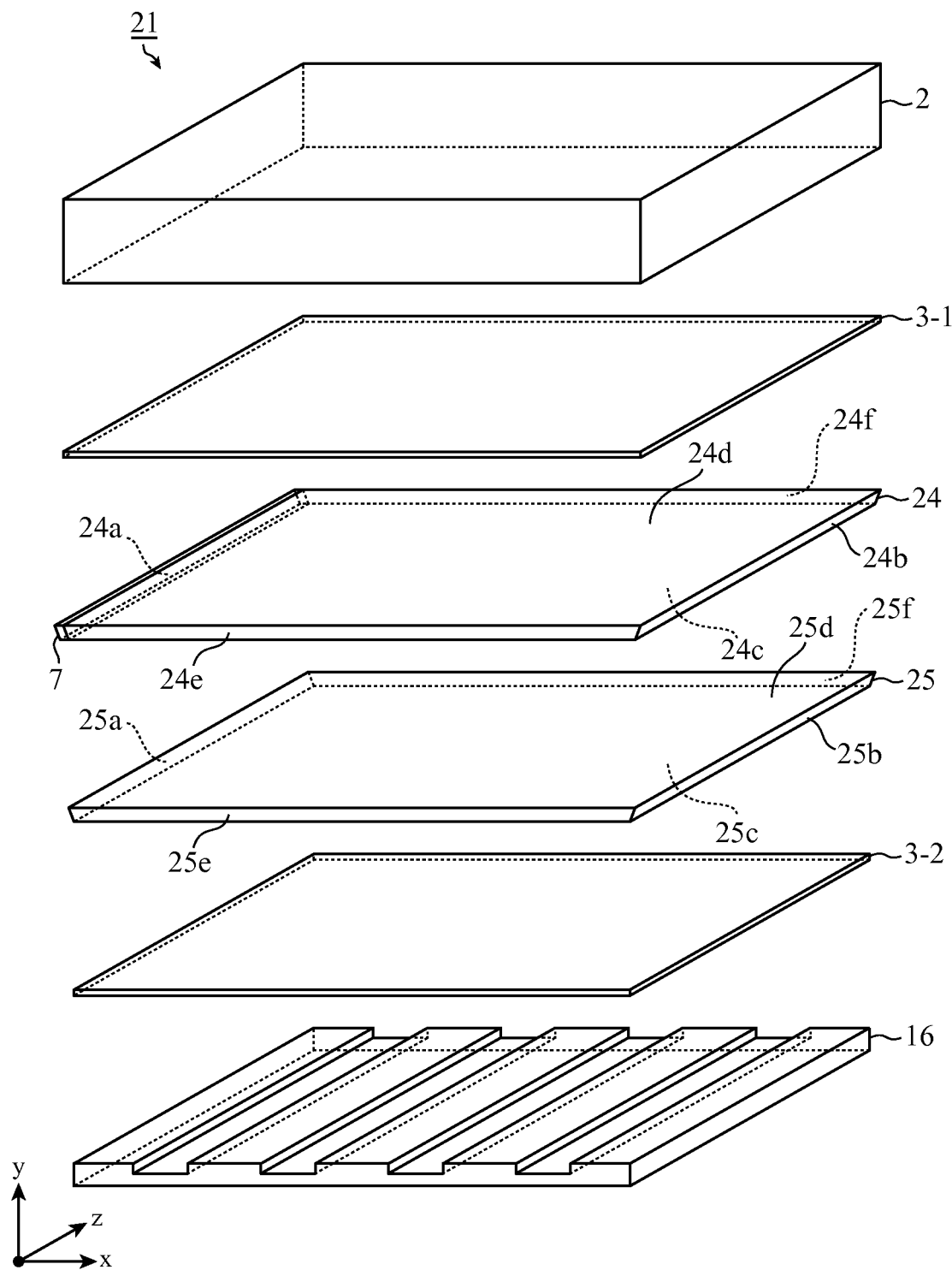
FIG. 9 is an exploded perspective view of the planar waveguide laser pumping module in accordance with Embodiment 3.

FIG. 8 is an appearance perspective view showing the structure of a planar waveguide laser pumping module 21 in accordance with Embodiment 3, and FIG. 9 is an exploded perspective view of the module. As shown in FIGS. 8 and 9, in the planar waveguide laser pumping module 21 in accordance with this Embodiment 3, a reinforcement board 2, a first clad 3-1, a transparent member 24, a laser medium 25, a second clad 3-2, and a heat sink 16 are laminated in a direction y of the thickness, and an end surface 24a of the transparent member 24 upon which pumping light 8 is incident is covered by a pumping light antireflection member 7. In the figures, a dashed dotted line denotes the pumping light 8, and chain double-dashed lines denote first to fourth laser oscillation light beams 9-1 to 9-4.

Because the structure of the planar waveguide laser pumping module 21 in accordance with this Embodiment 3 is the same as that of the planar waveguide laser pumping module 11 in accordance with above-mentioned Embodiment 2 except for the transparent member 24 and the laser medium 25, the same components as those shown in FIGS. 5 to 7 or like components are designated by the same reference numerals in FIGS. 8 and 9, and the explanation of the components will be omitted hereafter.

In the planar waveguide laser pumping module 21, the transparent member 24 is comprised of an end surface 24a upon which the pumping light 8 is incident, and end surfaces 24b to 24f. The end surfaces 24a and 24b which are opposite to each other have a parallel positional relationship with the first to fourth laser oscillation light beams 9-1 to 9-4, and a perpendicular positional relationship with the end surfaces 24e and 24f, and are connected with the end surface 24d at acute angles and are connected with the end surface 24c at obtuse angles because the end surfaces 24a and 24b are inclined with respect to a y axis extending in a direction of the thickness. The end surfaces 24c and 24d which are opposite to each other have a parallel positional relationship with the first to fourth laser oscillation light beams 9-1 to 9-4, and a perpendicular positional relationship with the end surfaces 24e and 24f, and the end surface 24c is optically connected with an end surface 25d of the laser medium 25 and the end surface 24d is optically connected with the first clad 3-1. The end surfaces 24e and 24f which are opposite to each other have a perpendicular positional relationship with the first to fourth laser oscillation light beams 9-1 to 9-4, and a perpendicular positional relationship with the end surfaces 24a, 24b, 24c, and 24d.

Because the end surfaces 24e and 24f have a tapered shape which tapers off toward the heat sink 16 in this transparent member 24, a cross section taken along the direction y of the thickness has a trapezoidal shape.

As the transparent member 24, a material which allows the pumping light 8 and the first to fourth laser oscillation light beams 9-1 to 9-4 to pass therethrough, and which has a coefficient of thermal expansion which is substantially the same as that of the laser medium 25 in order to prevent a crack due to a stress at the time of being joined is used. Further, as the material of the transparent member 24, a material having a refractive index equal to or lower than that of the laser medium 25 is used.

The laser medium 25 is comprised of end surfaces 25a to 25d, and 25f, and an end surface 25e upon which the first to fourth laser oscillation light beams 9-1 to 9-4 are incident. The end surfaces 25a and 25b which are opposite to each other have a parallel positional relationship with the first to fourth laser oscillation light beams 9-1 to 9-4, and a perpendicular positional relationship with the end surfaces 25e and 25f, and are connected with the end surface 25d at acute angles and are connected with the end surface 25c at obtuse angles because the end surfaces 25a and 25b are inclined with respect to the y axis extending in a direction of the thickness. The end surfaces 25c and 25d which are opposite to each other have a parallel positional relationship with the first to fourth laser oscillation light beams 9-1 to 9-4, and a perpendicular positional relationship with the end surfaces 25e and 25f, and the end surface 25c is optically connected with the second clad 3-2 and the end surface 25d is optically connected with the end surface 24c of the transparent member 24. The end surfaces 25e and 25f which are opposite to each other have a perpendicular positional relationship with the first to fourth laser oscillation light beams 9-1 to 9-4, and a perpendicular positional relationship with the end surfaces 25a, 25b, 25c, and 25d.

Because the end surfaces 25e and 25f have a tapered shape which tapers off toward the heat sink 16 in this laser medium 25, a cross section taken along the direction y of the thickness has a trapezoidal shape.

The transparent member 24 and the laser medium 25 are constructed of materials having an equal refractive index, and the end surface 24c of the transparent member 24 and the end surface 25d of the laser medium 25 are optically joined to each other, so that a waveguide is formed between the first clad 3-1 and the second clad 3-2 and the pumping light 8 and the first to fourth laser oscillation light beams 9-1 to 9-4 are confined within the waveguide.

In a case in which the transparent member 24 is constructed by using a material having a lower refractive index than that of the laser medium 25, the first to fourth laser oscillation light beams 9-1 to 9-4 can be confined between the second clad 3-2 and the end surface 24c of the transparent member 24. Further, in this case, by adjusting the difference in the refractive index between the transparent member 24 and the laser medium 25, the number of waveguide modes of the first to fourth laser oscillation light beams 9-1 to 9-4 can be varied.

Next, the operation of the planar waveguide laser pumping module 21 will be explained.

Figure 10:
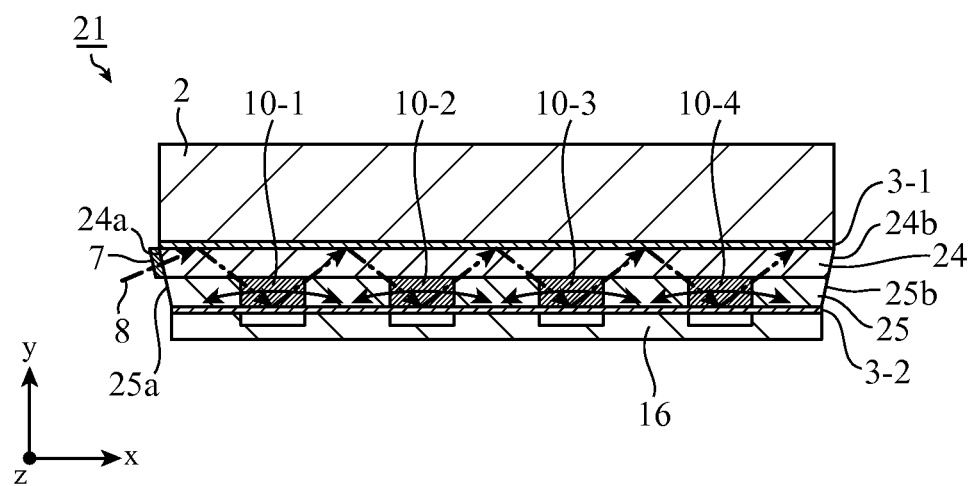
FIG. 10 is a cross-sectional view taken along the A-A' line of FIG. 8 of the planar waveguide laser pumping module in accordance with Embodiment 3.

FIG. 10 is a cross-sectional view, taken along the A-A' line of FIG. 8, of the planar waveguide laser pumping module 21 in accordance with this Embodiment 3. As shown in FIG. 10, the pumping light 8 passes through the pumping light antireflection member 7 and is incident upon the inside of the transparent member 24 from the end surface 24a of the transparent member 24, and advances toward a direction of the first clad 3-1. Next, when reaching the interface between the first clad 3-1 and the transparent member 24, the pumping light 8 is reflected, propagates through the transparent member 24 and the laser medium 25 in that order toward the laser medium 25, and a part of the pumping light 8 is absorbed by the laser medium 25. Then, when reaching the interface between the second clad 3-2 and the laser medium 25, the pumping light 8 is reflected and propagates through the laser medium 25 and the transparent member 24 in that order toward the transparent member 24. The pumping light 8 propagates between the first clad 3-1 and the second clads 3-2 in a zigzag manner and is absorbed every time when passing through the laser medium 25 in this way.

When being incident upon a non-joined region in the laser medium 25 which is not joined to the heat sink 16, the pumping light 8 is absorbed by the laser medium 25 and a part of the absorbed pumping light 8 changes to heat. The heat in the laser medium 25 which is generated by the absorption of the pumping light 8 flows into a joined region in which the laser medium 25 is joined to the heat sink 16, as shown by solid lines in FIG. 10, and generates a plurality of temperature distributions in the laser medium 25. As a result, a refractive index distribution occurs in the laser medium 25 and a plurality of heat lenses are produced, so that first to fourth resonator mode regions 10-1 to 10-4 are formed.

In this structure, by adjusting the ratio of the thickness of the transparent member 24 and that of the laser medium 25 and the propagation angle in the waveguide of the pumping light 8, like in the case of above-mentioned Embodiment 1, the pumping light 8 propagates through the transparent member 24 and the laser medium 25 in a zigzag manner in such a way as to pass through the non-joined regions in the laser medium 5 which are not joined to the heat sink 16.

In this case, because the end surfaces 25e and 24f of the transparent member 24 and the end surfaces 25e and 25f of the laser medium 25 have a tapered shape, a parasitic oscillation can be prevented from occurring between the end surfaces 25e and 25f of the laser medium 25.

Although the case in which there are four resonator mode regions is shown in the illustrated example, by adjusting the number of comb teeth of the heat sink 16, the ratio of the thickness of the transparent member 24 and that of the laser medium 25, or the waveguide propagation angle of the pumping light 8 even if the number of resonator mode regions is varied, the pumping light 8 can be made to propagate in such a way as to pass through the resonator mode regions in the laser medium 25.

Although the example in which the end surface 24a of the transparent member 24 is covered by the pumping light antireflection member 7 is shown in the above-mentioned explanation, the pumping light antireflection member 7 can be eliminated in a case in which the angle of incidence of the pumping light 8 upon the end surface 24a is set to a Brewster angle.

Further, although the example in which the end surfaces 24e and 24f of the transparent member 24 and the end surfaces 25e and 25f of the laser medium 25 are made to have a tapered shape which tapers off toward the heat sink 16 is shown in the above-mentioned explanation, the end surfaces can be made to have a tapered shape which conversely tapers off toward the reinforcement board 2.

Further, although the example in which the end surfaces 24e and 24f of the transparent member 24 and the end surfaces 25e and 25f of the laser medium 25 are made to have a tapered shape is shown in the above-mentioned explanation, surfaces in the same direction of the reinforcement board 2 and the heat sink 16 can be made to have a tapered shape in order to facilitate the processing.

As mentioned above, the planar waveguide laser pumping module 21 in accordance with Embodiment 3 is constructed in such a way that each of cross sections of the laser medium 25 and the transparent member 24 in the direction y of the thickness perpendicular to the direction z of the optical axes of the first to fourth laser oscillation light beams 9-1 to 9-4 has a trapezoidal shape. Therefore, in addition to the same advantage as that provided by above-mentioned Embodiment 1, a parasitic oscillation which may occur between the end surface 25a of the laser medium 25 upon which the pumping light 8 is incident, and the end surface 25b opposite to this end surface 25a can be prevented.

Embodiment 4

Figure 11:
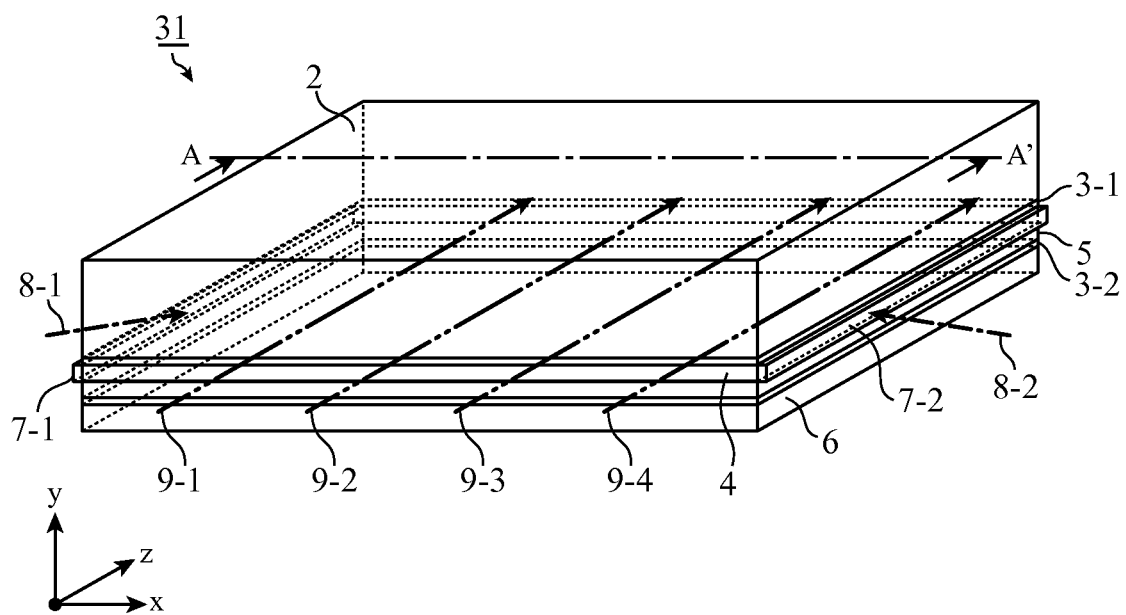
FIG. 11 is an appearance perspective view showing the structure of a planar waveguide laser pumping module in accordance with Embodiment 4 of the present invention.

FIG. 11 is an appearance perspective view showing the structure of a planar waveguide laser pumping module 31 in accordance with this Embodiment 4. As shown in FIG. 11, in the planar waveguide laser pumping module 31 in accordance with this Embodiment 4, a reinforcement board 2, a first clad 3-1, a transparent member 4, a laser medium 5, a second clad 3-2, and a heat sink 6 are laminated in a direction y of the thickness, and an end surface 4a of the transparent member 24 upon which a first pumping light beam 8-1 is incident is covered by a first pumping light antireflection member 7-1 and an end surface 4b of the transparent member 24 upon which a second pumping light beam 8-2 is incident is covered by a second pumping light antireflection member 7-2. In the figure, dashed dotted lines denote the first and second pumping light beams 8-1 and 8-2, and chain double-dashed lines denote first to fourth laser oscillation light beams 9-1 to 9-4.

Because the structure of the planar waveguide laser pumping module 31 in accordance with this Embodiment 4 is the same as that of the planar waveguide laser pumping module 1 in accordance with above-mentioned Embodiment 1 with the exception that the first and second pumping light antireflection members 7-1, and 7-2 are disposed on the end surfaces 4a and 4b in the case in which the first and second pumping light beams 8-1 and 8-2 are incident from the end surfaces 4a and 4b of the transparent member 4 which are opposite to each other, the same components as those shown in FIGS. 1 and 2 or like components are designated by the same reference numerals in FIG. 11, and the explanation of the components will be omitted hereafter.

The first and second pumping light beams 8-1 and 8-2 have a wavelength which the laser medium 5 absorbs, and are incident upon the inside of the transparent member 4 from the end surfaces 4a and 4b via the first and second pumping light antireflection members 7-1 and 7-2. As each of the light sources of the first and second pumping light beams 8-1 and 8-2, for example, a semiconductor laser or a fiber laser can be used. Because it is possible to arrange these light sources along a direction of the optical axes of the first to fourth laser oscillation light beams 9-1 to 9-4, the power of the first and second pumping light beams 8-1 and 8-2 can be increased by using either abroad area semiconductor laser capable of outputting high power and having a wide light emitting area or a semiconductor laser array, capable of outputting high power, in which emitters are arranged in a row.

The light sources of the first and second pumping light beams 8-1 and 8-2 can be arranged close to the end surfaces 4a and 4b of the transparent member 4, respectively. Further, collimate lenses can be installed between the light sources of the first and second pumping light beams 8-1 and 8-2 and the end surfaces 4a and 4b, respectively, so as to make the first and second pumping light beams 8-1 and 8-2 be collimated light beams and make these collimated light beams be incident upon the end surfaces 4a and 4b.

Next, the operation of the planar waveguide laser pumping module 31 will be explained.

Figure 12:
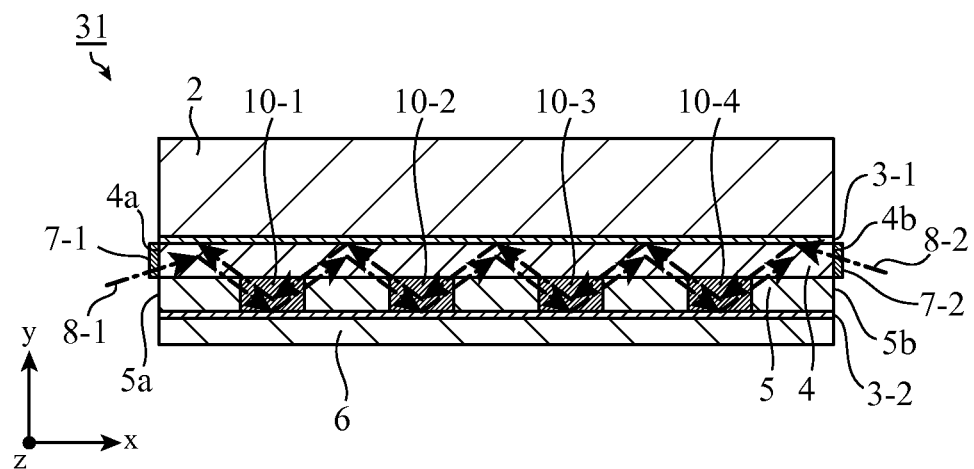
FIG. 12 is a cross-sectional view taken along the A-A' line of FIG. 11 of the planar waveguide laser pumping module in accordance with Embodiment 4.

FIG. 12 is a cross-sectional view, taken along the A-A' line of FIG. 11, of the planar waveguide laser pumping module 31 in accordance with this Embodiment 4. As shown in FIG. 12, the first pumping light beam 8-1 passes through the first pumping light antireflection member 7-1 and is incident upon the inside of the transparent member 4 from the end surface 4a of the transparent member 4, and advances toward a direction of the first clad 3-1. Next, when reaching the interface between the first clad 3-1 and the transparent member 4, the first pumping light beam 8-1 is reflected, propagates through the transparent member 4 and the laser medium 5 in that order toward the laser medium 5, and a part of the first pumping light beam 8-1 is absorbed by the laser medium 5. Then, when reaching the interface between the second clad 3-2 and the laser medium 5, the first pumping light beam 8-1 is reflected and propagates through the laser medium 5 and the transparent member 4 in that order toward the transparent member 4. The first pumping light beam 8-1 propagates between the first clad 3-1 and the second clads 3-2 in a zigzag manner and is absorbed every time when passing through the laser medium 5 in this way.

The second pumping light beam 8-2 passes through the second pumping light antireflection member 7-2 and is incident upon the inside of the transparent member 4 from the end surface 4b of the transparent member 4, and advances toward a direction of the first clad 3-1. Next, when reaching the interface between the first clad 3-1 and the transparent member 4, the second pumping light beam 8-2 is reflected, propagates through the transparent member 4 and the laser medium 5 in that order toward the laser medium 5, and a part of the second pumping light beam 8-2 is absorbed by the laser medium 5. Then, when reaching the interface between the second clad 3-2 and the laser medium 5, the second pumping light beam 8-2 is reflected and propagates through the laser medium 5 and the transparent member 4 in that order toward the transparent member 4. The second pumping light beam 8-2 propagates between the first clad 3-1 and the second clads 3-2 in a zigzag manner and is absorbed every time when passing through the laser medium 5 in this way, like the first pumping light beam 8-1.

At this time, by adjusting the ratio of the thickness of the transparent member 4 and that of the laser medium 5 and each of the propagation angles in the waveguide of the first and second pumping light beams 8-1 and 8-2, the first and second pumping light beams 8-1 and 8-2 propagating through the transparent member 4 and the laser medium 5 in a zigzag manner are made to propagate in such a way as to pass through first to fourth resonator mode regions 10-1 to 10-4 in the laser medium 5.

As mentioned above, the planar waveguide laser pumping module 31 in accordance with Embodiment 4 is constructed in such away that the first and second pumping light beams 8-1 and 8-2 are incident from two directions opposite to each other (the end surface 4a side and the end surface 4b side). Therefore, in addition to the same advantage as that provided by above-mentioned Embodiment 1, a further increase in the output power can be implemented as compared with above-mentioned Embodiment 1 without changing the size of the laser medium. Further, because the light beams are incident from the two directions opposite to each other, the heat distribution of the entire laser medium can be made to be symmetrical, and a stable laser oscillation can be implemented.

Although the planar waveguide laser pumping module in accordance with Embodiment 4 is constructed in such a way that the first and second pumping light antireflection members 7-1 and 7-2 are disposed for the planar waveguide laser pumping module 1 in accordance with above-mentioned Embodiment 1, and the first and second pumping light beams 8-1 and 8-2 are made to be incident upon them, this embodiment can be similarly applied to each of the planar waveguide laser pumping modules 11 and 21 in accordance with above-mentioned Embodiments 2 and 3, the output power of the laser oscillation can be increased and the laser oscillation can be stabilized.

Embodiment 5

Figure 13:
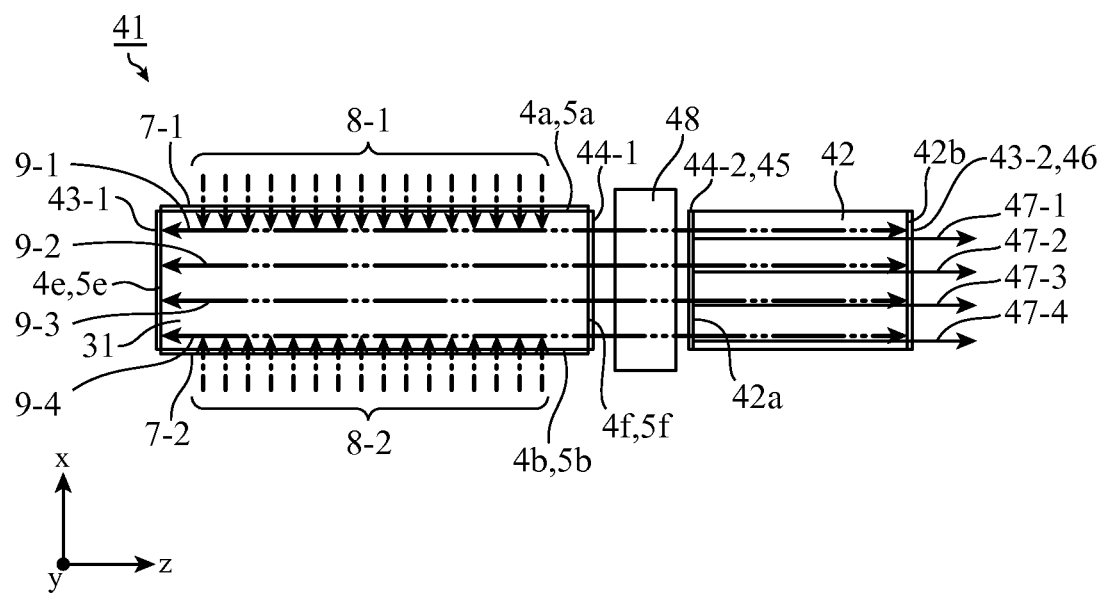
FIG. 13 is a top plan view showing the structure of a planar waveguide wavelength conversion laser device in accordance with Embodiment 5 of the present invention.

FIG. 13 is a top plan view showing the structure of a planar waveguide wavelength conversion laser device 41 in accordance with Embodiment 5. As shown in FIG. 13, the planar waveguide wavelength conversion laser device 41 is comprised of a planar waveguide laser pumping module 31, a planar waveguide wavelength conversion element 42, and a resonator mode controlling unit 48. In the figure, dashed dotted lines denote first and second pumping light beams 8-1 and 8-2, chain double-dashed lines denote first to fourth laser oscillation light beams 9-1 to 9-4, and solid lines denote first to fourth wavelength converted light beams 47-1 to 47-4.

Because the structure of the planar waveguide laser pumping module 31 in accordance with this Embodiment 5 is the same as that of the planar waveguide laser pumping module 31 in accordance with above-mentioned Embodiment 4, the same components as those shown in FIGS. 1 and 2 or like components are designated by the same reference numerals in FIG. 13, and the explanation of the components will be omitted hereafter.

In the planar waveguide laser pumping module 31, a first pumping light antireflection member 7-1 is disposed on an end surface 4a of a transparent member 4, and a second pumping light antireflection member 7-2 is disposed on an end surface 4b opposite to this end surface 4a. Further, a first fundamental wave light reflecting member 43-1 is disposed on an end surface 5e of a laser medium 5 of the planar waveguide laser pumping module 31, and a first fundamental wave light transmitting member 44-1 is disposed on an end surface 5f opposite to this end surface 5e. At a position opposite to this first fundamental wave light transmitting member 44-1, the resonator mode controlling unit 48 is installed.

Further, the planar waveguide laser pumping module 31 is formed to have a rectangular parallelepiped shape of being long in a direction z of the optical axes of the first to fourth laser oscillation light beams 9-1 to 9-4 so as to implement a laser oscillation in a longitudinal direction of the laser medium 5. As a result, because a high gain is acquired and the sensitivity to a variation in the resonator loss is low, a stable laser operation can be performed.

In the planar waveguide wavelength conversion laser device 41, the planar waveguide wavelength conversion element 42 is comprised of a nonlinear optical member, two clads, a reinforcement board, and a heat sink. The clads are joined to upper and lower surfaces of the nonlinear optical member, respectively, and the heat sink is joined to one of the clads and the reinforcement board is bonded to the other clad. End surfaces 42a and 42b of this planar waveguide wavelength conversion element 42 have a perpendicular positional relationship with the first to fourth laser oscillation light beams 9-1 to 9-4, and are opposite to each other. This end surface 42a is placed closely at a position opposite to the end surface 5f of the laser medium 5 of the planar waveguide laser pumping module 31 while the resonator mode controlling unit 48 is placed between the end surface and the module.

Further, a second fundamental wave light transmitting member 44-2 and a wavelength conversion light reflecting member 45 are disposed on the end surface 42a of the planar waveguide wavelength conversion element 42. On another end surface 42b, a second fundamental wave light reflecting member 43-2 and a wavelength conversion light transmitting member 46 are disposed.

As a non-linear optical material which constructs the planar waveguide wavelength conversion element 42, a typical wavelength conversion material is used. For example, KTP, KN, BBO, LBO, CLBO, $LiNbO_3$, $LiNbTaO_3$, or the like is used. As an alternative, MgO-doped $LiNbO_3$, MgO-doped $LiNbTaO_3$, stoichiometric $LiNbTaO_3$, or the like, which is resistant to optical damage, or MgO-doped $LiNbO_3$, MgO-doped $LiNbTaO_3$, stoichiometric $LiNbO_3$, stoichiometric $LiNbTaO_3$, or the like having a periodic polarization reversing structure is used.

In the planar waveguide wavelength conversion laser device 41, the resonator mode controlling unit 48 has a function of forming resonator modes of the first to fourth laser oscillation light beams 9-1 to 9-4, and an antireflection member (not shown) for the first to fourth laser oscillation light beams 9-1 to 9-4 is disposed on each of both end surfaces of the resonator mode controlling unit. As this resonator mode controlling unit 48, for example, a lens array is used. Although the resonator mode controlling unit 48 is placed between the planar waveguide laser pumping module 31 and the planar waveguide wavelength conversion element 42 in the example of FIG. 13, the resonator mode controlling unit can be alternatively placed outside the planar waveguide laser pumping module 31, or inside the planar waveguide wavelength conversion element 42.

Next, the operation of the planar waveguide wavelength conversion laser device 41 will be explained.

The first and second pumping light beams 8-1 and 8-2 pass through the first and second pumping light antireflection members 7-1 and 7-2 from the end surfaces 4a and 4b of the transparent member 4 of the planar waveguide laser pumping module 31 and are incident upon the inside of the transparent member 4, respectively. Because a subsequent operation is performed in the same way as that of the planar waveguide laser pumping module 31 in accordance with above-mentioned Embodiment 4, the explanation of the operation will be omitted hereafter.

When the first and second pumping light beams 8-1 and 8-2 are incident upon the laser medium 5 in the planar waveguide laser pumping module 31, these first and second pumping light beams 8-1 and 8-2 are absorbed by the laser medium 5, a gain for the first to fourth laser oscillation light beams 9-1 to 9-4 is generated, the first to fourth laser oscillation light beams 9-1 to 9-4 (fundamental wave light beams) are generated between the first fundamental wave light reflecting member 43-1 disposed on the end surface 5e of the laser medium 5, and the second fundamental wave light reflecting member 43-2 disposed on the end surface 42b of the planar waveguide wavelength conversion element 42.

At this time, a part of the first to fourth laser oscillation light beams 9-1 to 9-4 incident upon the planar waveguide wavelength conversion element 42 is converted into first to fourth wavelength converted light beams 47-1 to 47-4 whose wavelength differs from that of the fundamental wave light beams, and they pass through the wavelength conversion light transmitting member 46 disposed on the end surface 42b of the planar waveguide wavelength conversion element 42, and are outputted to outside the planar waveguide wavelength conversion element. On the other hand, the first to fourth laser oscillation light beams 9-1 to 9-4 which are not converted into the first to fourth wavelength converted light beams 47-1 to 47-4 are reflected between the first and second fundamental wave light reflecting members 43-1 and 43-2 disposed on the end surfaces 42a and 42b of the planar waveguide wavelength conversion element 42, and are converted into first to fourth wavelength converted light beams 47-1 to 47-4 again.

By changing the phase matching condition of the non-linear optical material of the planar waveguide wavelength conversion element 42, it is also possible to generate a second harmonic wave, a sum frequency wave, and a difference frequency wave, or to implement an optical parametric oscillation. For example, in a case of using $NdYVO_4$ as the laser medium 5 of the planar waveguide laser pumping module 31, and using MgO-doped $LiNbO_3$ having a periodic polarization reversing structure which generates a second harmonic wave having a wavelength of 1064 nm as the non-linear optical material of the planar waveguide wavelength conversion element 42, green light having a wavelength of 532 nm can be outputted as each of the first to fourth wavelength converted light beams 47-1 to 47-4.

As mentioned above, the planar waveguide wavelength conversion laser device 41 in accordance with Embodiment 5 has a structure which is a combination of the planar waveguide laser pumping module 31 that complies with a side surface pumping method and has improved beam overlap efficiency, and the planar waveguide wavelength conversion element 42 that converts the wavelength of the first to fourth laser oscillation light beams 9-1 to 9-4 outputted from the planar waveguide laser pumping module 31, a high-efficiency, high-power, and small-sized wavelength conversion laser device suitable for the light source of a laser projector can be provided.

Although the planar waveguide wavelength conversion laser device 41 is constructed in Embodiment 5 by applying the planar waveguide wavelength conversion element 42 and the resonator mode controlling unit 48 to the planar waveguide laser pumping module 31 in accordance with above-mentioned Embodiment 4, the planar waveguide wavelength conversion element and the resonator mode controlling unit can also be applied similarly to each of the planar waveguide laser pumping modules 1, 11, and 21 in accordance with above-mentioned Embodiments 1 to 3, and the same advantage as that provided by Embodiment 5 can also be provided by this structure.

In a case of generating a heat lens in the laser medium 5 by using a heat sink 16 having a periodic comb structure, thereby forming resonator modes, like in the case of the planar waveguide laser pumping modules 11 and 21 in accordance with above-mentioned Embodiments 2 and 3, the resonator mode controlling unit 48 becomes unnecessary, and the component count can be reduced.

While the invention has been described in its preferred embodiments, it is to be understood that, in addition to the above-mentioned embodiments, an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

As mentioned above, because the planar waveguide laser pumping module in accordance with the present invention is constructed in such a way that the pumping light propagates through the transparent member and the laser medium in a zigzag manner, the planar waveguide laser pumping module is suitable for use as the light source of a laser projector, or the like which requires high output power.

EXPLANATIONS OF REFERENCE NUMERALS 1, 11, 21, 31 planar waveguide laser pumping module, 2 reinforcement board, 3-1 and 3-2 first and second clads, 4, 24 transparent member, 4a to 4f, 5a to 5f, 24a to 24f, 25a to 25f, 42a to 42b end surface, 5, 25 laser medium, 6, 16 heat sink, 7 pumping light antireflection member, 7-1 and 7-2 first and second pumping light antireflection members, 8 pumping light, 8-1 and 8-2 first and second pumping light beams, 9-1 to 9-4 first to fourth laser oscillation light beams, 10-1 to 10-4 first to fourth resonator mode regions, 41 planar waveguide wavelength conversion laser device, 42 planar waveguide wavelength conversion element, 43-1 and 43-2 first and second fundamental wave light reflecting members, 44-1 and 44-2 first and second fundamental wave light transmitting members, 45 wavelength conversion light reflecting member, 46 wavelength conversion light transmitting member, 47-1 to 47-4 first to fourth wavelength converted light beams, 48 resonator mode controlling unit.

The invention claimed is:

1. A planar waveguide laser pumping module comprising:
a planar laser medium;
a planar transparent member that has a refractive index equal to or smaller than that of said laser medium, and that is joined to a first surface of said laser medium;
a first clad that has a refractive index smaller than those of said laser medium and said transparent member, and that is joined to a first surface of said transparent member opposite to a second surface of said transparent member joined to the first surface of said laser medium;
a second clad that has a refractive index smaller than those of said laser medium and said transparent member, that is joined to a second surface of said laser medium opposite to the first surface of said laser medium joined to said transparent member, and that sandwiches said transparent member and said laser medium between itself and said first clad; and
a heat sink that is joined to said laser medium via said second clad,
wherein laser oscillations occur on a plurality of optical axes which are arranged at spacings in a planar direction of said laser medium, and pumping light is incident in a direction perpendicular to the optical axes of said laser oscillations, and alternately propagates on the plurality of optical axes of said laser medium and in said transparent member between the adjacent optical axes.

2. The planar waveguide laser pumping module according to claim 1, wherein each of cross sections of said laser medium and said transparent member in a direction perpendicular to the optical axis of said laser oscillation has a trapezoidal shape.

3. The planar waveguide laser pumping module according to claim 1, wherein an angle of incidence of said pumping light is a Brewster angle.

4. The planar waveguide laser pumping module according to claim 1, wherein said pumping light is incident from each of two directions opposite to each other.

5. The planar waveguide laser pumping module according to claim 1, wherein an angle of incidence of said pumping light is inclined with respect to a plane including said plurality of laser oscillations in a plurality of periodic resonator modes.

6. The planar waveguide laser pumping module according to claim 1, wherein said transparent member is made from a host material of said laser medium.

7. The planar waveguide laser pumping module according to claim 1, wherein in said laser medium and said transparent member, a ceramic material which constructs said laser medium and a ceramic material which constructs said transparent member are sintered integrally and are joined to each other.

8. The planar waveguide laser pumping module according to claim 1, wherein said laser medium and said transparent member are joined integrally by using diffusion bonding.

9. The planar waveguide laser pumping module according to claim 1, wherein said laser medium and said transparent member are joined integrally by using surface activated bonding.

10. The planar waveguide laser pumping module according to claim 1, wherein said heat sink has a comb structure in which a plurality of grooves extending in a direction parallel to the optical axis of said laser oscillation are formed at intervals, and a leading end of each comb tooth is joined to said laser medium via said second clad so as to produce a periodic temperature distribution in said laser medium, thereby generating a periodic heat lens through said periodic temperature distribution.

11. The planar waveguide laser pumping module according to claim 6, wherein said laser medium is made from Nd:YAG, Yb:YAG, or Er:YAG, and said transparent member is made from undoped YAG.

12. The planar waveguide laser pumping module according to claim 6, wherein said laser medium is made from $Nd:YVO_4$, $Yb:YVO_4$, or $Er:YVO_4$, and said transparent member is made from undoped $YVO_4$.

13. The planar waveguide laser pumping module according to claim 6, wherein said laser medium is made from Nd:glass, Yb:glass, or Er:glass, and said transparent member is made from undoped glass.

14. A planar waveguide wavelength conversion laser device comprising:
a planar waveguide laser pumping module according to claim 1; and
a wavelength conversion element that converts a wavelength of laser oscillation light outputted from said planar waveguide laser pumping module.

* * * * *